United States Patent [19]

Radmall

[11] Patent Number: 5,230,967
[45] Date of Patent: Jul. 27, 1993

[54] BATTERY COMPRISING INTERCONNECTING MEANS OF ELECTROCHEMICAL CELL UNITS

[76] Inventor: Paul Radmall, Marsh Lodge, Marsh Road, Leonard Stanley, Stonehouse, Glos. GL10 3NG, Great Britain

[21] Appl. No.: 834,568
[22] PCT Filed: Jun. 20, 1991
[86] PCT No.: PCT/GB91/00999
§ 371 Date: Mar. 30, 1992
§ 102(e) Date: Mar. 30, 1992
[87] PCT Pub. No.: WO91/20100
PCT Pub. Date: Dec. 26, 1991

[30] Foreign Application Priority Data

Jun. 20, 1990 [GB] United Kingdom ............ 9013755

[51] Int. Cl.$^5$ ............................................. H01M 2/26
[52] U.S. Cl. ................................... 429/152; 429/160; 429/178; 29/623.4
[58] Field of Search ............ 429/152, 158, 160, 178; 29/623.4

[56] References Cited

U.S. PATENT DOCUMENTS 3,597,277  8/1971  Dickfeldt et al. .
3,783,030  1/1974  Tietze ................................ 429/152
3,841,915  10/1974 Eberle ............................... 429/160
4,098,966  7/1978  Brown .
4,452,869  6/1984  DeMoully et al. ............. 429/178 X
4,554,227  11/1985 Takagaki et al. ................. 429/178

FOREIGN PATENT DOCUMENTS 0217550  4/1987  European Pat. Off. .
3734131  12/1988 Fed. Rep. of Germany .
2211017  6/1989  United Kingdom .

Primary Examiner—Stephen Kalafut
Attorney, Agent, or Firm—Young & Thompson

[57] ABSTRACT

A battery comprises a stack of electrochemical cell units (1) each comprising a positive electrode (2), a solid electrolyte (3) and a negative electrode (4), the electrodes of the cell units being interconnected by means of a plurality of connector devices (7, 8) each comprising a base section (7a, 8a) connected to an electrode and a pair of contact sections (7c, 8c) extending from the cell unit, the devices (7, 8) being arranged in two stacks with the pairs of contact sections (7c, 8c) of the devices in each stack overlying one another to form two sets of contact sections, adjacent contact sections (7c, 8c) of each set being interconnected with successive interconnections throughout each stack of connector devices alternating between the two sets of contact sections. Unit cells may be connected in parallel or series. Connector devices (7, 8) of opposite polarity may be provided symmetrically either side of a centerline about which the unit cell (1) can be rotated 180° to be stacked in either of two orientations. The connector devices (7, 8) may be provided at adjacent corners of rectangular unit cells.

13 Claims, 5 Drawing Sheets

BATTERY COMPRISING INTERCONNECTING MEANS OF ELECTROCHEMICAL CELL UNITS

TECHNICAL FIELD

This invention relates to a battery which comprises at least three electrochemical cell units and in particular, to a method and means to interconnect the electrodes of said electrochemical cell units.

In conventional battery design the electrochemical cell units are interconnected by complex systems which are expensive and difficult to install, or by means of simpler systems which may mean the interconnection means is greater in thickness than the battery leading to the problems this may cause.

SUMMARY OF THE INVENTION

The present invention is concerned with providing a battery which includes an electrochemical cell unit interconnection means which alleviates the above mentioned problems.

A battery according to the present invention comprises a stack of at least three electrochemical cell units each comprising a positive electrode, a solid electrolyte and a negative electrode, the electrodes of the cell units being interconnected by means of a plurality of connector devices characterised in that each connector device (7, 8) comprises a base section (7a, 8a) connected to an electrode and a pair of contact sections (7b, 7c, 8b, 8c) extending from the cell unit, and the connector devices (7, 8) are arranged in two stacks with the pairs of contact sections (7b, 7c, 8b, 8c) of the devices in each stack overlying one another to form two sets of contact sections, adjacent contact sections 7b, 7c, 8b, 8c) of each set being interconnected with successive interconnections throughout each stack of connector devices alternating between the two sets of contact sections.

. In one embodiment of the present invention, the battery also includes two terminal members, wherein each terminal member includes a main body section having a contact means so as to enable connection to apparatus to be driven by the battery or recharging means; and an arm like member in close proximity to the main body section throughout its length.

Preferably, the arm like member is L-shaped and the terminal is formed by cutting a piece of material to form the main body section and the arm like member.

The terminal may be manufactured from any suitable electrically conductive material, for example, stainless steel.

According to a second aspect, the present invention, comprises a method of interconnecting at least three electrochemical cell units of a battery characterised by providing each with a connector device (7, 8) with a base section (7a, 8a) by which it is connected to an electrode of the cell unit and a pair of contact sections (7b, 7c, 8b, 8c) which extend from the cell unit (1), arranging the cell units (1) in a stack so that the connector devices (7, 8) form two stacks with the pairs of contact sections (7b, 7c, 8b, 8c) of the devices in each stack overlying one another to form two sets of contact sections, and interconnecting adjacent contact sections (7b, 7c, 8b, 8c) of each set so that successive interconnections throughout each stack of connector devices alternate between the two sets of contact sections.

The present invention enables connection, in a simple and effective manner, between the electrochemical components in a battery. It can therefore be used to effect electrical connection between individual electrochemical cells or groups/combinations of electrochemical cells.

For example, the present invention can be used to effect the electrical connections necessary to produce a battery in which the electrochemical cells are stacked in parallel or series.

Alternatively the present invention can be used to effect the electrical connections necessary to produce a battery in which groups of electrochemical cells, which have been previously stacked (parallel stack/series stack/Bi polar stack), are stacked in parallel or series.

In a preferred example of the present invention the battery comprises a lithium metal or lithium alloy negative electrode and the connector devices are manufactured from stainless steel.

Preferably, the contact sections of the connector devices are connected together by spot welding.

DESCRIPTION OF THE DRAWINGS

The invention will now be illustrated by way of description of an example, made in accordance with the present invention, with reference to the accompanying drawings, in which.

DETAILED DESCRIPTION OF THE INVENTION

Figure 1:
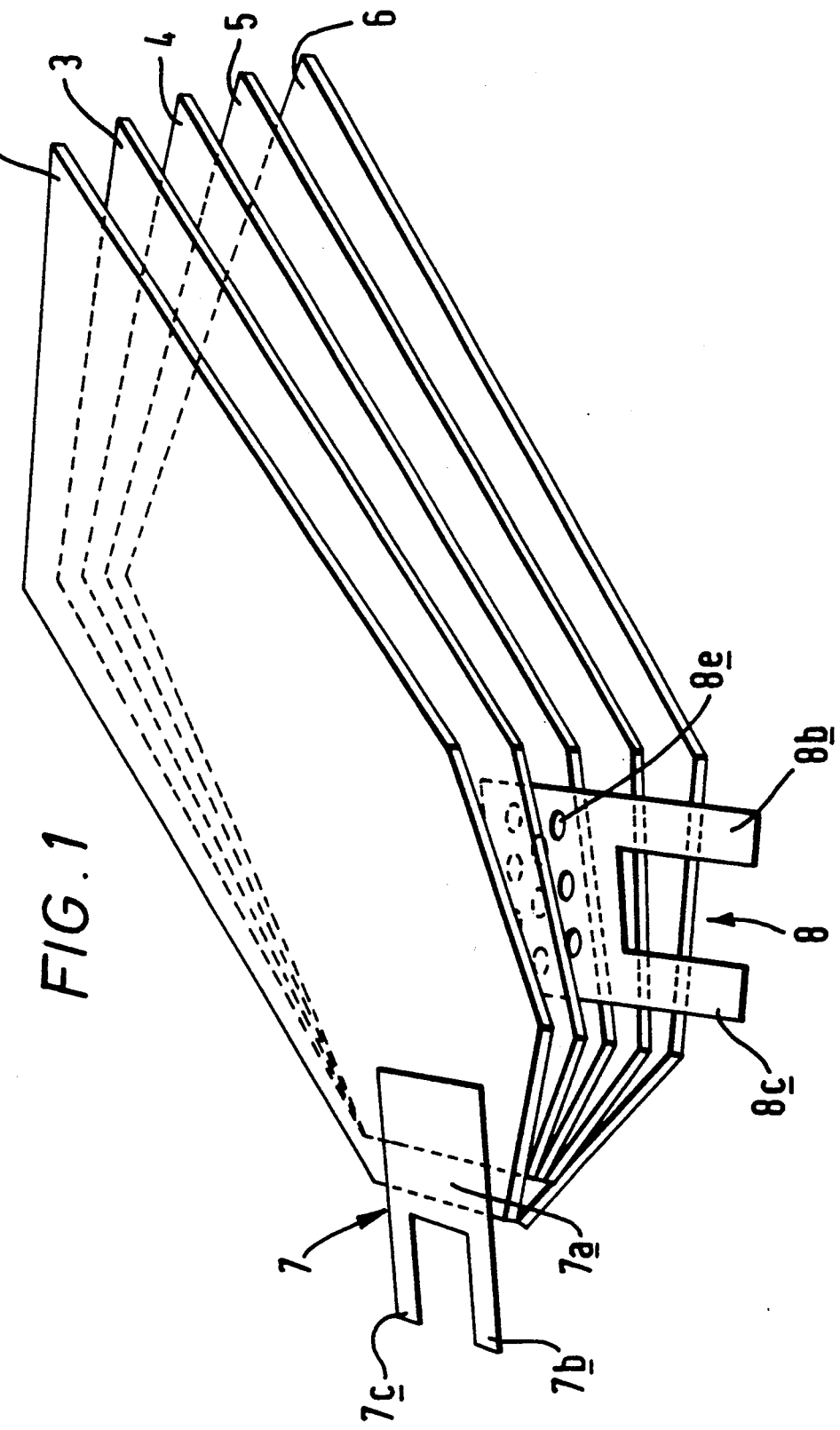
FIG. 1 shows a schematic fanned view of an electrochemical cell unit for use in a battery made in accordance with the present invention.

Now referring to FIG. 1 of the drawings, an electrochemical cell unit 1 for use in a battery made in accordance with the present invention, comprises:

a first layer 2 of an active positive material dispersed and held in a polymeric material which constitutes the positive electrode of the cell unit;

a second layer 3 of a solid polymeric material, such as Polyethylene Oxide having Propylene Carbonate and Ethylene Carbonate dispersed therein, along with a lithium salt, which constitutes the electrolyte material of the electrochemical cell unit;

a third layer 4 of lithium metal which constitutes the negative electrode of the electrochemical cell unit;

a fourth layer 5 of the same material as the second layer 3; and a fifth layer 6 of the same material as the first layer 2.

In the example shown, the layers of the electrochemical cell unit, and therefore the electrochemical cell unit, are substantially rectangular in plan view, with two adjacent corners at one end thereof being cut off.

The electrochemical cell unit is provided with two devices 7 and 8 which provide means in a battery made in accordance with the present invention of interconnecting, as required, the electrodes of the electrochemical cell units within the battery.

Figure 5:
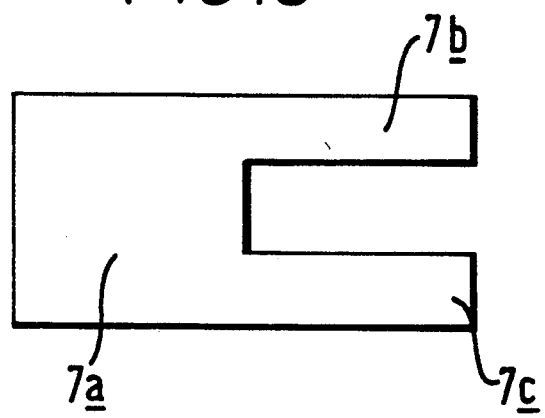
FIGS. 5-7 show three different embodiments of electrode interconnecting devices.
Figure 7:
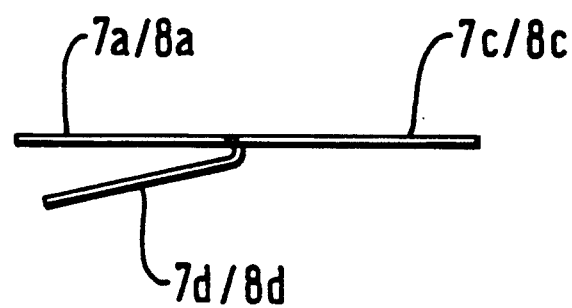

The first of these devices 7 (FIG. 5) comprises:
a base section 7a;

a first elongate member 7b extending from the base section 7a;

a second elongate member 7c extending parallel to the first elongate member 7b from the base section 7a; and a folded section 7d (FIG. 7), which is folded back towards the base section so that the base section 7a and the folded section 7d can be used to hold a member therebetween.

The device 7 has its base section 7a connected to one of the positive electrode layers 2 or 6, and the folded section 7d is connected to the other of the positive electrode layers 2 or 6.

Figure 6:
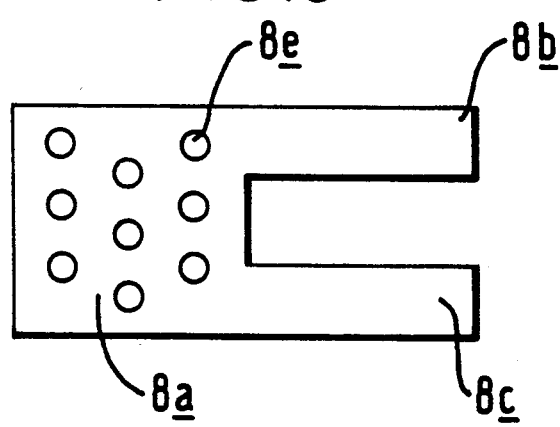

The second of these devices 8 (FIG. 6) comprises:

a base section 8a having a number of holes 8e formed therein;

a first elongate member 8b extending from the base section 8a;

a second elongate member 8c extending parallel to the first elongate member 8b extending from the base section 8a; and a folded section 8d (FIG. 7), which is folded back towards the base section 8a so that the base section 8a and the folded section 8d can be used to hold a member therebetween.

The device 8 has its base section 8a, and folded section 8d, arranged so that they hold the negative electrode in position. In order to ensure good continuity within the electrochemical cell unit the device 8 is cold welded to the negative electrode so that the surfaces of the negative electrode and the non-contacting surfaces of the device 8 are flush. The provision of the holes 8e in the base section 8a of the device assists with this.

Each of the devices 7 and 8 are manufactured in a similar way from a rectangular sheet of metal, for example stainless steel. The sheet is provided with two inwardly extending parallel cuts from one end, in order to break one end of the sheet up into three sections. The middle one of these sections is now folded back so as to define a clip with the uncut section of the sheet of metal. In this way the other two sections of the sheet define the two parallel extending elongate sections of the devices.

It will be clearly apparent to anyone skilled in this type of technology that the devices 7 and 8 should be made from electrically conductive material which does not react with the other components of the electrochemical cell unit. For example, in the present example the negative electrode of the electrochemical cell unit is made from lithium therefore the devices 7, 8 are manufactured from stainless steel which is reactively inert with respect to lithium.

If, for example, in this particular example a metal such as aluminium was used to manufacture the devices 7, 8 whilst devices with suitable electrical conductivity would be produced, the aluminum and lithium would alloy together reducing the efficiency of the operation of the cell.

The devices 7, 8 are connected to the electrochemical cell units at respective adjacent corners which are cut off to the respective layers of the electrochemical cell unit. With regard to the device 7 which is connected to the first layer 2 and the fifth layer 6 between which is sandwiched the third layer 4 or opposing electrode of the electrochemical cell unit, in order to ensure that the electrochemical cell unit is not shorted by contact between the third layer 4 and either, the device 7, or the first layer 2 and/or fifth layer 6, this corner is cut off to a greater degree than this corner of the other layers.

Figure 2:
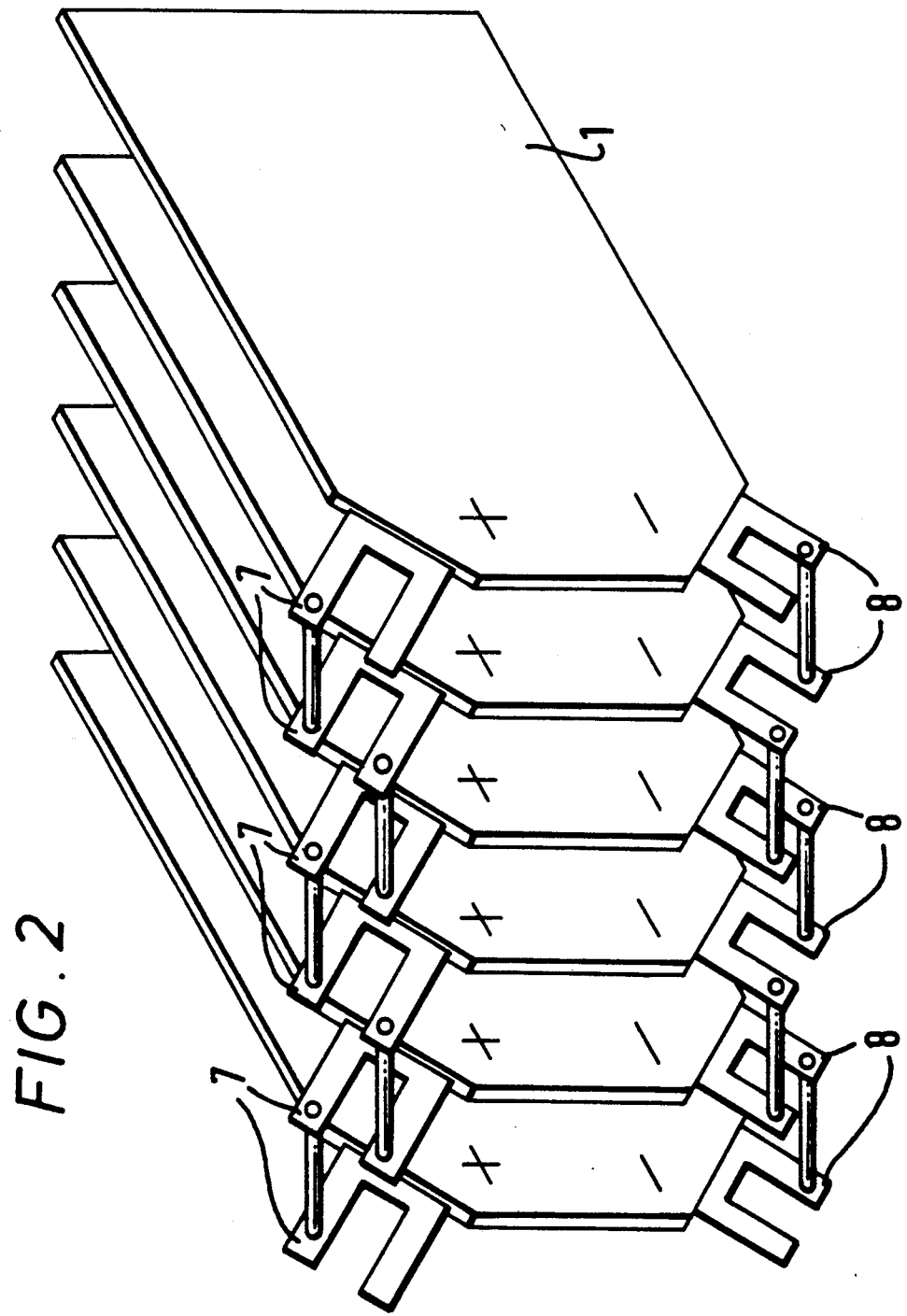
FIG. 2 shows a schematic separated view of a battery made in accordance with the present invention.

Now referring to FIG. 2 of the accompanying drawings, the method in which the electrochemical cell units 1 are assembled in a first example of a battery in accordance with the present invention is shown.

In this particular example, the electrochemical cell units are stacked so that the devices 7 and 8 form two rows of terminals/devices. One row comprises the devices 7 of the stacked electrochemical cell units so that all the positive electrodes of the electrochemical cell units may be connected together, and the other row comprises the devices 8 of the stacked electrochemical cell units so that all the negative electrodes of the electrochemical cell units may be connected together.

Further, it should be noted that each of the rows of devices comprise two separate lines of elongate members 7a, 8a.

Therefore, in this particular example a parallel stack of electrochemical cell units 1 is formed.

Further, in order to connect together the devices of the respective rows of the electrochemical cell units the two lines of elongate members are spot welded to one another alternately.

Figure 3:
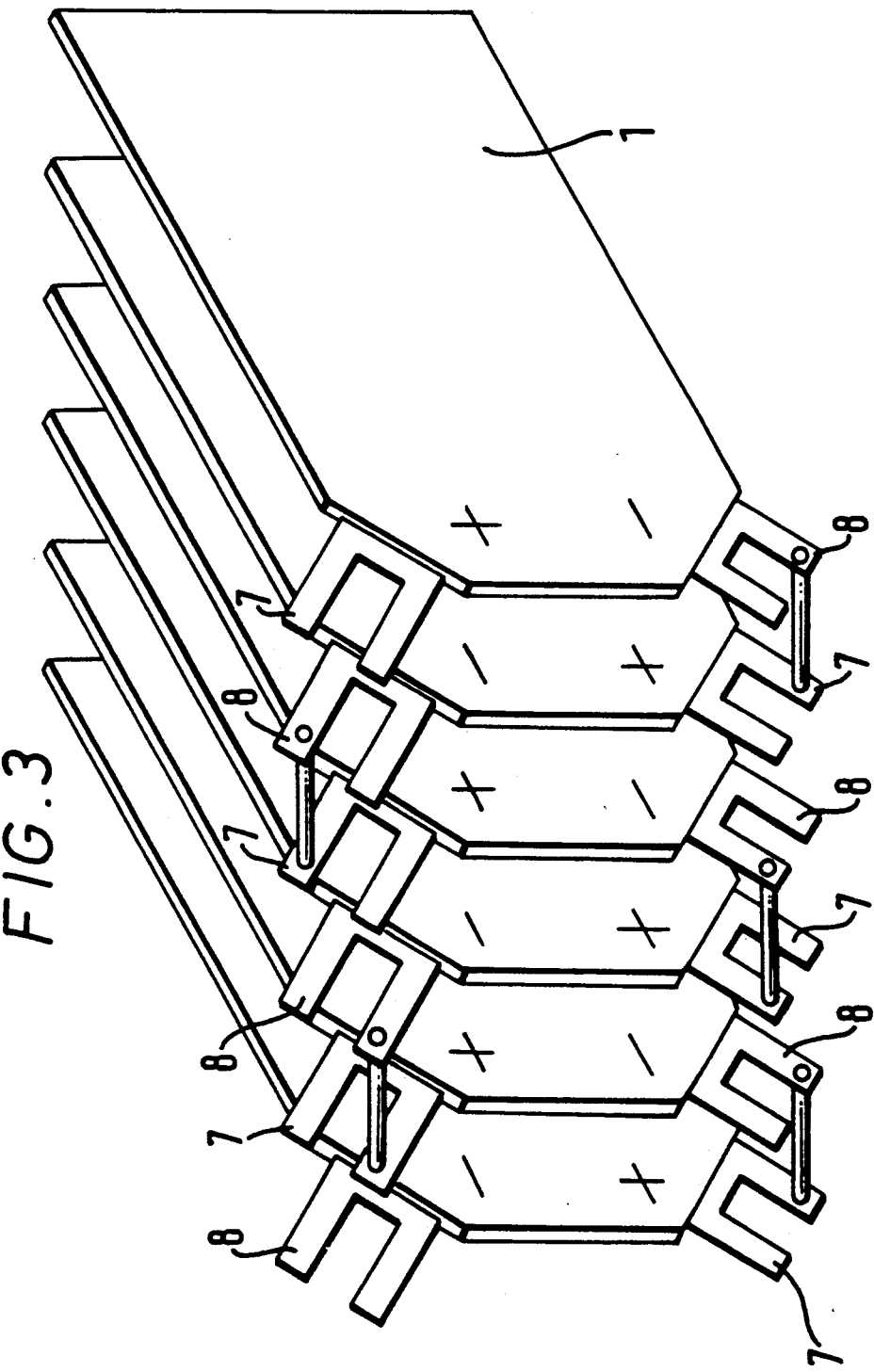
FIG. 3 shows a schematic separated view of a second form of battery made in accordance with the present invention.

Now referring to FIG. 3 of the accompanying drawings the method in which the electrochemical cell units 1 are assembled in a second example of a battery in accordance with the present invention is shown.

In this particular example, the electrochemical cell units are stacked so that the devices 7 and 8 again form two rows of terminals/devices. However, in this particular example the electrochemical cell units are stacked so that two rows comprise alternate adjacent devices 7, 8.

Therefore in this example a series stack of electrochemical cell units 1 is formed.

The devices within a respective row are interconnected in identical fashion to those within the previous example.

Figure 4:
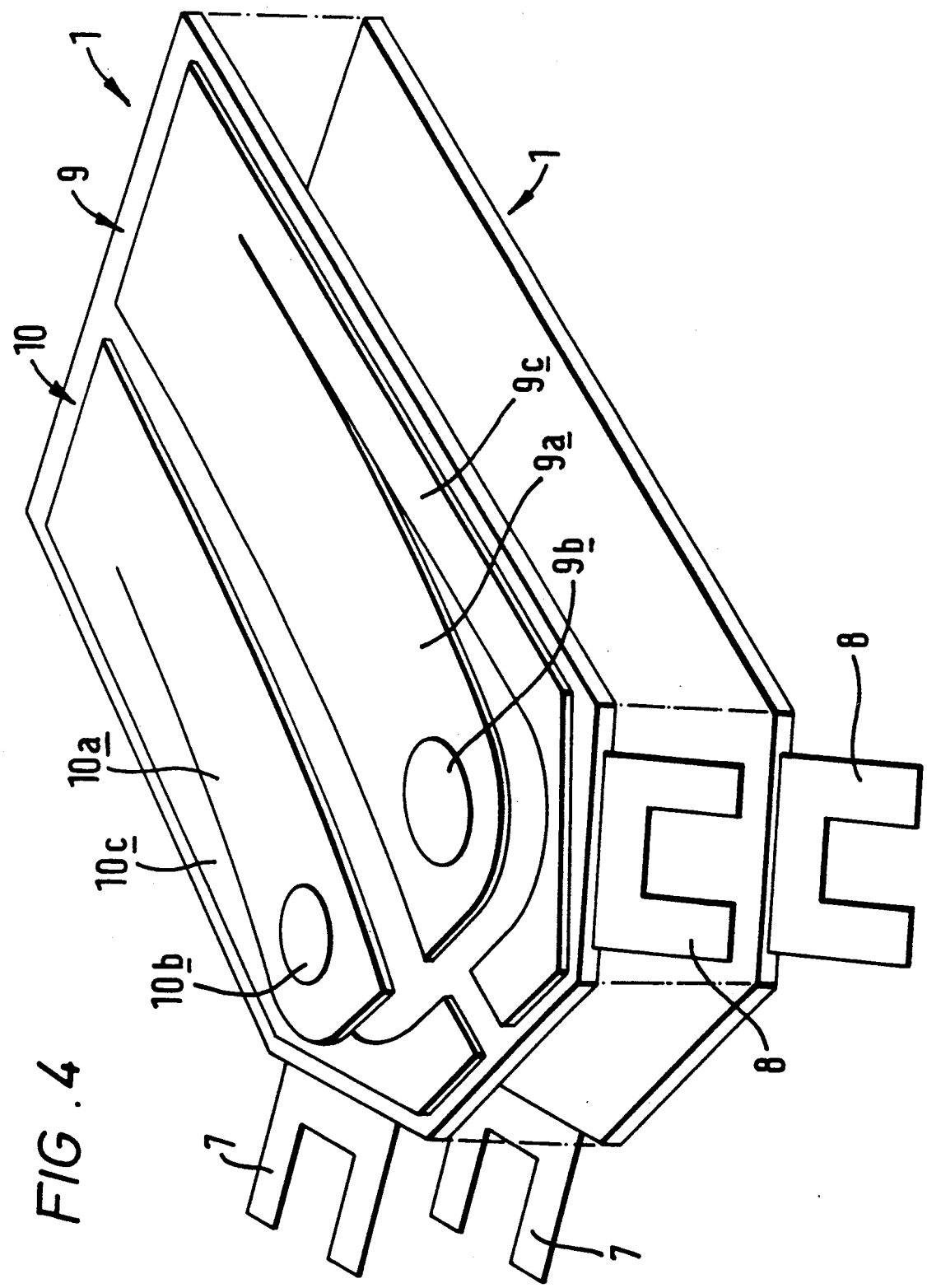
FIG. 4 shows a schematic view of the terminals for the batteries shown in FIGS. 2 and 3.

Now referring to FIG. 4 of the accompanying drawings, there is shown the means by which the two rows of devices are connected to respective terminals 9, 10 by which the battery can be connected to apparatus it is too drive, and if appropriate by which it can be recharged.

The two terminals are essentially identical to one another the only difference being that they are mirror images along the longitudinal plane of another.

Each of the terminals comprises a main body section 9a, 10a having a contact point 9b, 10b and an L-shaped arm section 9c, 10c which extends from and is in close proximity to the main body section 9a, 10a throughout its length.

The terminals are formed from a single piece of metal and this is cut so as to provide the L-shaped arm section 9c, 10c.

In the parallel stack arrangement described above with reference to FIG. 2 of the drawings, the terminals are positioned on the exposed surface of one of the electrochemical cell units and insulated from one another. In this way the L-shaped arm member 9c, 10c may be easily contacted to the respective row of devices 7 or 8.

It should be noted that with the parallel stack arrangement, the potential difference between any two points in the respective rows of device is the same. Therefore, for simplicity sake the L-shaped arm members 9c, 10c can be connected to the devices 7, 8 of the electrochemical cell unit on which they are positioned.

Further, as the exposed surfaces of the electrochemical cell units are in fact the positive electrodes of the cell units it is necessary to insulate electrically at least the terminal connected to the negative side of the arrangement from this surface. This can be easily achieved by using a sheet of insulating material, for example polypropylene, or coating the terminal with polypropylene.

In the series stack arrangement described above with reference to FIG. 3 of the drawings, the situation is not quite as simple, as to realise the full potential difference across the battery one of the terminals is to be contacted to one of the devices 7 or 8 of the electrochemical cell unit at one end of the arrangement, whilst the other terminal is to be contacted to the device 7 or 8, of opposing polarity, of the electrochemical cell unit at the other end of the arrangement.

Therefore, in this example, the terminals are positioned on the exposed surface of one of the electrochemical cell units and insulated from one another.

One of the terminals 9 or 10 has its L-shaped arm member contacted to, for example, the device 7, and therefore the positive side of the arrangement, of the uppermost electrochemical cell unit, i.e. the cell unit the terminals are positioned upon. The other terminal 10 or 9 meanwhile has its L-shaped arm member contacted via an insulated line the device 8, and therefore the negative side of the arrangements, of the bottom electrochemical cell unit of the arrangement.

Further, as in the parallel stack arrangement the exposed surfaces of the electrochemical cell units is the positive electrode thereof. Therefore at least the terminal contacted to the negative side of the arrangement should be insulated from the surface on which it is positioned. This may be achieved in similar fashion to that proposed with the parallel stack arrangement.

I claim:

1. A battery comprising a stack of at least three electrochemical cell units each comprising a positive electrode, a solid electrolyte and a negative electrode, the electrodes of the cell units being interconnected by means of a plurality of connector devices characterized in that each connector device comprises a base section connected to an electrode and a pair of contact sections extending from the cell unit, and the connector devices are arranged in two stacks with the pairs of contact sections of the devices in each stack overlying one another to form two sets of contact sections, adjacent contact sections of each set being interconnected with successive interconnections throughout each stack of connector devices alternating between the two sets of contact sections.

2. A battery as claimed in claim 1 in which each cell unit (7) has a positive connector device (7) connected to the positive electrode and a negative connector device connected to the negative electrode.

3. A battery as claimed in claim 2 in which adjacent cell units are connected in parallel with the positive connector devices and negative connector devices in separate stacks.

4. A battery as claimed in claim 2 in which adjacent cell units are connected in series with the positive and negative connector devices in each stack alternating.

5. A battery as claimed in claim 2 in which the positive and negative connector devices are arranged symmetrically either side of a center line of the cell unit about which the cell unit can be rotated 180 degrees to be stacked with the other cell units in either of two orientations.

6. A battery as claimed in claim 5 in which the cell unit is substantially rectangular in outline and has connector devices provided at adjacent corners.

7. A battery as claimed in claim 6 in which adjacent corners of the cell unit are removed to accommodate the connector devices.

8. A battery as claimed in claim 1 in which each cell unit comprises two outer electrodes of one polarity and an inner electrode of the opposite polarity with solid electrolyte between the inner electrode and each outer electrode, a connector device being connected to both outer electrodes by sections thereof that embrace an edge portion of the cell unit.

9. A battery as claimed in claim 8 in which said sections that embrace an edge portion of the cell unit comprise the base section and a second extending from between the contact sections in a direction away from the contact sections.

10. A battery as claimed in claim 9 in which the contact sections of each connector device comprise a pair of elongate sections.

11. A battery as claimed in claim 1 which has two terminal members each including a main body section with contact means adapted to contact apparatus externally of the battery, and an arm-like member in close proximity to the main body section throughout its length.

12. A battery as claimed in claim 11 in which the arm-like member is L-shaped.

13. A method of interconnecting at least three electrochemical cell units of a battery characterized by providing each with a connector device with a base section by which it is connected to an electrode of the cell unit and a pair of contact sections which extend from the cell unit, arranging the cell units in a stack so that the connector devices form two stacks with the pairs of contact sections of the devices in each stack overlying one another to form two sets of contact sections, and interconnecting adjacent contact sections of each set so that successive interconnections throughout each stack of connector devices alternate between the two sets of contact sections.

* * * * *